April 7, 1959   T. G. MYERS   2,881,013
APPARATUS FOR SEALING SUBMERSIBLE DEVICES
Original Filed July 1, 1949   2 Sheets-Sheet 1

INVENTOR.
THOMAS G. MYERS,
BY
John Flam
ATTORNEY.

THOMAS G. MYERS,
INVENTOR.

BY John Flam
ATTORNEY.

ated Apr. 7, 1959

2,881,013
APPARATUS FOR SEALING SUBMERSIBLE DEVICES

Thomas G. Myers, Los Angeles, Calif., assignor to U.S. Electrical Motors, Inc., Los Angeles, Calif., a corporation of California Application July 1, 1949, Serial No. 102,538, now Patent No. 2,687,907, dated August 31, 1954, which is a division of application Serial No. 453,126, July 31, 1942. Divided and this application September 4, 1953, Serial No. 380,034

4 Claims. (Cl. 286—11)

This invention relates to submersible structures, such as submersible electric motors adapted to be lowered in a well for driving a pump directly connected to the motor.

This application is a division of the application of Thomas G. Myers, Serial No. 102,538, filed July 1, 1949, entitled "Apparatus for Sealing Submersible Devices," now Patent No. 2,687,907, issued August 31, 1954, said application being a division of an abandoned application of Thomas G. Myers, Serial No. 453,126, filed July 31, 1942, entitled "Submersible Structure."

Usually the material pumped from the well is of such character as to be harmful to the motor should it enter into the motor casing. For example, when water is pumped, it should be kept away from the windings and contacting parts, so as not to cause electrical circuits to be improperly established, that would disable the motor. Also, such liquids usually carry grit, sand or other foreign matter that would quickly ruin the bearings inside of the motor. Accordingly, it is of considerable importance to segregate the casing interior as completely as possible from the liquid in which it is submerged.

It is one of the objects of this invention to make it possible, in a simple and effective manner, to insure against entry of the external liquid to the operating parts of the motor.

It has been proposed in the past to provide rotary seals of various kinds to effect this result, the seals being disposed around the shaft that necessarily must extend out of the motor casing. However, since the motor casing is subjected to varying liquid pressure, dependent upon the depth at which it is submerged, these ordinary seals have been found quite inadequate. It is another object of this invention to provide a multiple seal effect to insure to a greater degree against failure of the seal.

It is another object of this invention to utilize the rotating contact surface type of seal to supplement a liquid seal.

It is still another object of this invention to provide a combination liquid seal, such as mercury, and a seal formed by contact between a pair of relatively rotatable members, the liquid overlapping the region of contact.

A further object of the invention is to provide improved seals embodying relatively rotatable members, in which transverse flexure of the rotating shaft under certain load conditions is permissible without disturbing the sealing contact between the relatively rotatable members. In this connection, the sealing contact is assured by arrangement providing one or more supplemental seals.

It is still another object of this invention to improve, in general, seals embodying such relatively rotatable members.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
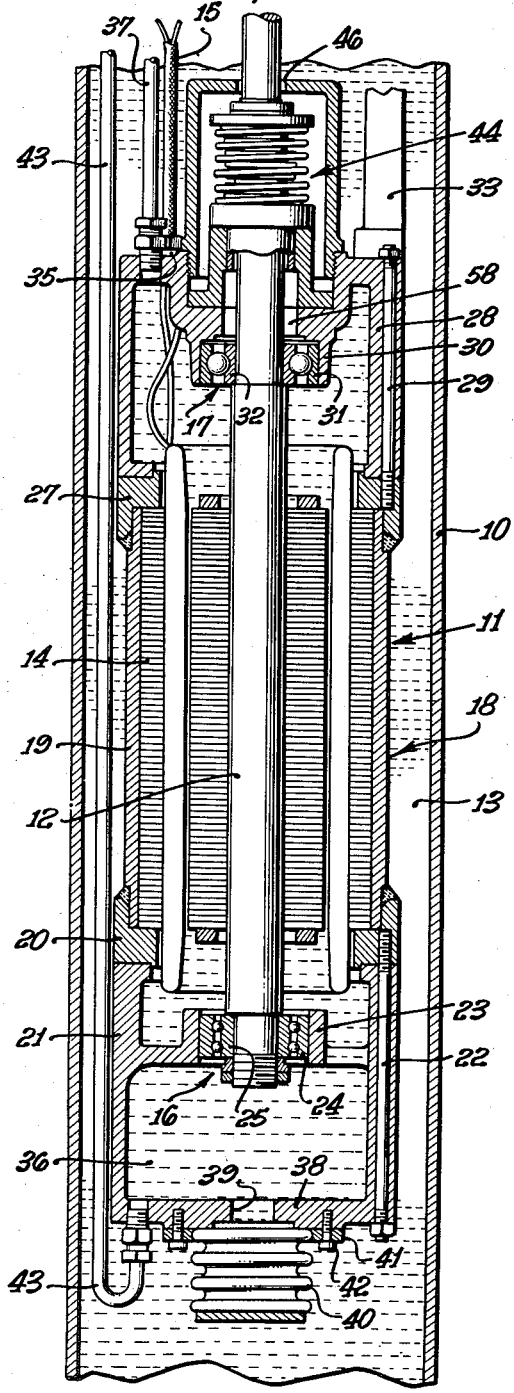
Figure 1 is a view, mainly in longitudinal section, of a structure embodying the invention, shown as submerged in a well.

The general character of the submersible structure is illustrated to best advantage in Fig. 1, wherein a well casing 10 has a submersible electric motor 11 disposed therein. This motor has an upwardly extending drive shaft 12, adapted to be connected, for example, to a pump (not shown) for pumping liquid from the well. The motor is shown as submerged in the well liquid 13, which is usually water.

The motor is most conveniently an induction motor of the squirrel cage type having primary or stator windings 14. These windings are adapted to be connected to a suitable source of power at the top of the well by means of a cable 15.

Since the liquid carries foreign particles or dirt, the bearings 16, 17 supporting the shaft 12 must be protected from this liquid. Furthermore, the windings 14 of the motor must also be kept separate from this liquid, otherwise the motor would be quickly disabled.

In order to secure these results, a casing structure 18 is provided, which is so arranged that the well liquid is excluded from the parts that need to be protected for all conditions of operation as regards well pressure, level of the liquid, etc. This casing structure is shown as formed by a cylindrical body 19 within which the stator 14 is supported. Secured to the lower end of the body 19, as by welding, is a lower collar 20, to which is fastened a bearing supporting housing 21, as by a series of threaded studs 22. The housing 21 provides a stationary collar 23 for supporting the outer race 24 of a radial ball bearing structure 16, the inner race 25 of which is secured on the shaft 12. The rotor laminations 26 are mounted on the shaft 12, as is well understood. Since the body 19 may be made from standard pipe, it is a simple matter to provide a body of the correct length for the rating of the particular motor involved.

An upper collar 27 is secured to the top of the body 19, as by welding, and has an upper bearing housing and casing head 28 secured thereto, as by studs 29, in a manner similar to that in which the lower bearing housing 21 is secured to the lower collar 20. The housing 28 provides an axially extending boss 30 serving to support the outer race 31 of a radial and thrust ball bearing structure 17, the inner race 32 of which is mounted on the shaft 12.

The shaft extends upwardly beyond the bearing for connection with a pump, not shown. The pump may be connected mechanically to the casing of the motor as by the aid of a foot structure 33, supported upon the head member 28. The shaft passes through the head 28 out of the casing structure, and it is apparent that precautions must be taken to prevent entry of liquid around the rotating shaft 12 at this place. The manner in which this is accomplished will be described shortly.

The cable 15 extends through a coupling member 35 in fluid tight relation with the top of the head 28, leading the connections from the windings 14 upwardly out of the casing structure 18.

It is preferred to have a filling of inert, lubricating liquid 36 within the casing structure. For this purpose lubricating oil is convenient, although other suitable liquids may be used. The liquid filling 36 in the casing may be replenished as desired, for example, by means of a supply pipe 37 connected to a passageway through the head member 28. The pipe may lead to the top of the well for connection to a source of the liquid under suitable pressure.

It is advantageous that liquid pressure inside the casing structure 18 be closely controlled. In this way, there is an assurance that the sealing means provided for the shaft 12 will not be subjected to any undue pressure differential. Substantial equalization of pressure between the liquid filling 36 in the motor casing and the exterior liquid 13 is secured by the aid of a structure now to be described. Thus, the bearing housing 21 has an extension. This extension is provided with a bottom flange 38 having a through aperture 39. This aperture is in communication with the interior of a metal bellows 40 extending downwardly from the flange 38. This metal bellows is placed in fluid tight connection with the flange 38, as by the aid of the flange 41 and screws 42. It is apparent that the pressure of the oil 36 within the casing 18 tends to expand the bellows 40 and the pressure of the water 13 outside of the casing tends to contract the bellows. Any variation in pressure, therefore, that would tend to arise, such as that due to temperature variation within the casing, would be equalized by operation of the bellows 40.

Since the interior of the casing 18 is closed at the bottom by the metal bellows 40, the renewal of the oil within the casing by withdrawal of the old oil, is accomplished by providing an emptying pipe 43 for the oil connected to the bottom of the casing, as by being in communication with the interior of the bearing housing extension 21. When it is desired to replace the old oil, therefore, a circulation is provided by the aid of appropriate pumping mechanism at the top of the well to force oil downwardly through the pipe 37 and to remove it through the pipe 43.

Figure 2:
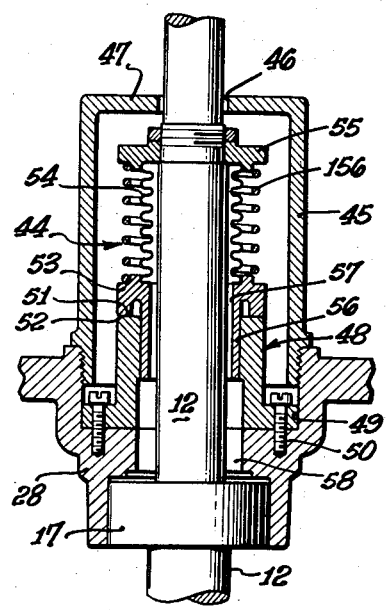
Fig. 2 is an enlarged fragmentary sectional view of the structure shown in Fig. 1, and particularly showing the construction of a seal for the submersible structure.

The seal 44 disclosed in Figs. 1 and 2 around the upper end of the rotary shaft 12 is housed partly within the casing head 28 and partly within an upwardly extending tubular member 45, that may be threadedly secured in the head. This tubular extension is provided with an annular clearance aperture 46 in its end portion 47 around the shaft 12, to permit transverse flexure of the latter under certain load conditions.

The seal structure 44 includes a non-rotary member 48 located within a casing head recess 49 and secured to the casing by screws 50, or the like. This member extends upwardly along the shaft 12 and has an annular sealing face or surface 51 at its upper end contacted by a companion face 52 on a rotary seal member 53, which is carried by the shaft. The rotary member 53 is secured to the lower end of a flexible or metal bellows 54, the upper end of which is attached to a collar 55 fixed on the shaft 12. A helical spring 156 may also be disposed around the bellows 54 between the collar 55 and rotary seal member 53, for the purpose of urging the latter downwardly into firm sealing engagement with the annular face 51 of the non-rotary member 48.

For the purpose of maintaining the rotary and non- rotary members 53, 48 coaxial and in alignment, with their annular sealing faces 51, 52 in proper engagement with one another, the rotary member is provided with a depending tubular extension or flange 56 telescoped within the non-rotary member 48. If desired, the cylindrical external surface of the flange 56 may make a sliding fit with the cylindrical internal surface on the non-rotary member 48, to provide a telescopic cylindrical or tubular seal between the flange and the inner wall of the non-rotary member, which supplements the seal provided between co-engaging annular faces 51, 52.

Under certain load conditions, transverse flexure of the shaft 12 is possible, which may disturb the accuracy of the contact between the annular faces 51, 52 of the rotary and non-rotary members 53, 48. To prevent such contact from being disturbed by transverse flexure of the shaft, and to allow such flexing to occur without interfering with the shaft seal, a substantial annular clearance space 57 is provided between the exterior of the shaft 12 and the interior of the rotary members 53, and its depending tubular extension 56. A substantial annular clearance space 58 is also provided between the shaft and head 28. Since the rotary member is connected to the shaft through the flexible metal bellows 54, the shaft 12 may be deflected transversely without contacting or interfering with the position of the rotary member 53 relative to the non-rotary member 48. Any tendencies for the transverse flexing of the shaft to shift the rotary member 53 transversely of the non-rotary member 48 is prevented by the telescopic fit of the depending extension or flange 56 within the non-rotary member 48.

Figure 3:
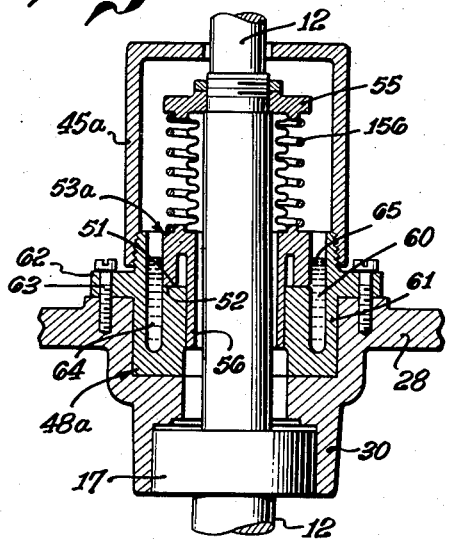
Figs. 3, 4, 5 and 6 are views similar to Fig. 2, disclosing modified forms of sealing structures.

The form of shaft seal disclosed in Fig. 3 is similar to the one disclosed in Fig. 2. However, an additional heavy liquid seal is provided.

As shown in Fig. 3, the non-rotary member 48a is formed with a circumferential channel or groove 60, and has an outer wall 61 extending substantially above the annular contacting faces 51, 52 of the rotary and non-rotary members. The non-rotary member fits within the casing recess 49, and has a flange 62 through which screws 63 pass into the casing head 28 for the purpose of securing the non-rotary member 48a to the latter. A tubular casing extension 45a is threadedly secured to the upper end of the non-rotary member 48a.

The sealing arrangement disclosed in Fig. 3 is the same as in Fig. 2. However, the circumferential channel or groove 60 is filled with a heavy liquid seal 64, which may be mercury or carbon tetrachloride, for example, to a level 65 substantially above the annular contacting sealing faces 51, 52. This liquid seal 64 is in communication with the well fluid 13, that can enter the casing extension 45a through the clearance aperture 46. However, contamination of the filling liquid 36 in the casing by the well fluid is prevented by the three different seals provided. These include the liquid seal 64 circumscribing the rotary member 53a and the non-rotary member 48a; the annular contacting faces 51, 52; and the coengaging cylindrical faces on the flange 56 and non-rotary member 48a.

Figure 4:
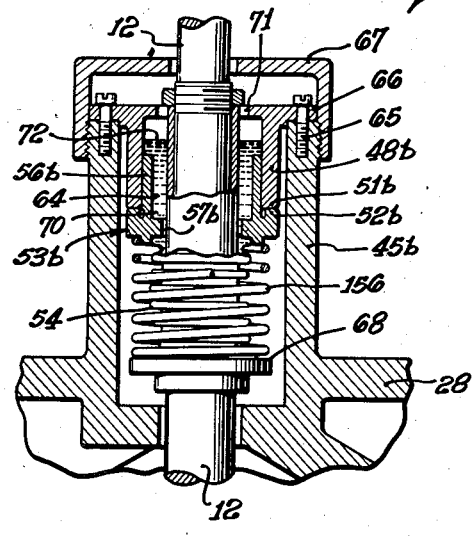

A triple seal is also provided in the form of invention disclosed in Fig. 4. The casing head 28 is provided with a tubular extension 45b, to the upper end of which the non-rotary sealing member 48b is secured, as by means of the screws 65 passing through the flange 66. A collar 67 may be threaded onto the tubular extension 45b, and is provided with an annular clearance aperture 46 around the shaft 12. The non-rotary member 48b depends from its flange into the extension 45b, and has a lower annular sealing edge or face 51b contacted by a companion annular sealing face 52b on the rotary member 53b carried by the shaft 12. The upper end of a bellows 54 is attached to the rotary member 53b, and the lower end of the bellows to a collar 68 fixed to the shaft in essentially the same manner as disclosed in Fig. 2. A helical spring 156 is disposed between the collar 68 and the rotary member 53b, urging the latter upwardly into firm sealing contact with the end face 51b of the non-rotary member 48b.

In order to maintain the rotary and non-rotary members in proper alignment, with their faces 51b, 52b effectively sealing against one another, a telescopically tubular extension or flange 56b projects upwardly from the rotary member 53b within the non-rotary member 48b. The external cylindrical surface of this projecting member 56b makes a telescopically sliding fit with the cylindrical inner wall of the non-rotary member 48b, providing a cylindrical seal therebetween.

As in the other forms of the invention, a substantial annular clearance space 57b is provided between the shaft 12 and the rotary and non-rotary members, to permit transverse flexure of the shaft 12 without disturbing the sealing contact between the end faces 51b, 52b and cylindrical faces of the rotary and non-rotary members. A third seal may also be provided, in the form of the heavy sealing liquid 64 in the annular space 70 between the shaft 12 and the rotary and non-rotary members 53b, 48b, and also the bellows 54. This liquid may be inserted in the annular space 70 through the annular clearance aperture 71 between the shaft 12 and the non-rotary member 48b. The level 72 of the liquid 64 is above the upper end of the telescopic flange 56b.

As a result of the arrangement described, the well fluid 13 is prevented from entering the casing by the liquid seal 64, the cylindrical seal, and the end seal 51b, 52b.

Figure 5:
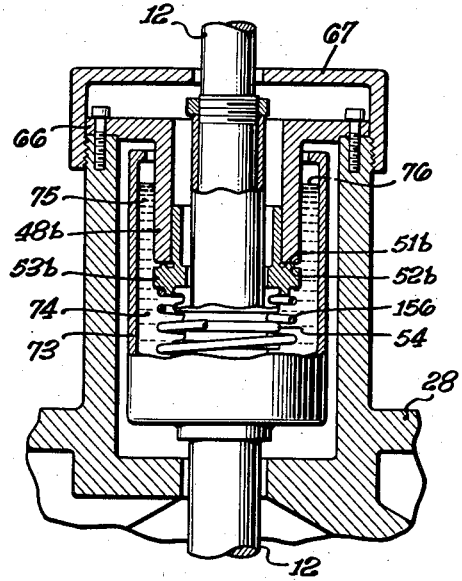

In the embodiment illustrated in Fig. 5, the rotary and non-rotary members 53b, 48b are arranged in essentially the same manner as in Fig. 4. However, provision is made for providing a liquid seal around the exterior of the rotary and non-rotary members. To provide such arrangement, an outer cup-shaped member or container 73 is secured to the shaft 12 below the bellows 54 and spring 156, and extends upwardly around the rotary and non-rotary members 53b, 48b to a point substantially above the annular contacting faces 51b, 52b. The cylindrical portion of the container 73 is spaced outwardly from the rotary and non-rotary members to provide an annular chamber 74 that can be filled with the sealing liquid 75 to a level 76 substantially above the location of the annular contacting faces.

In Fig. 5, the liquid filling 36 in the casing is prevented from contacting the sealing faces 51b, 52b by the liquid seal 75. In this instance, the three seals are still present, consisting of the outer liquid seal 75, the annular end contacting faces 51b, 52b and the cylindrical contacting faces of the flange 56b and non-rotary member 58b.

Figure 6:
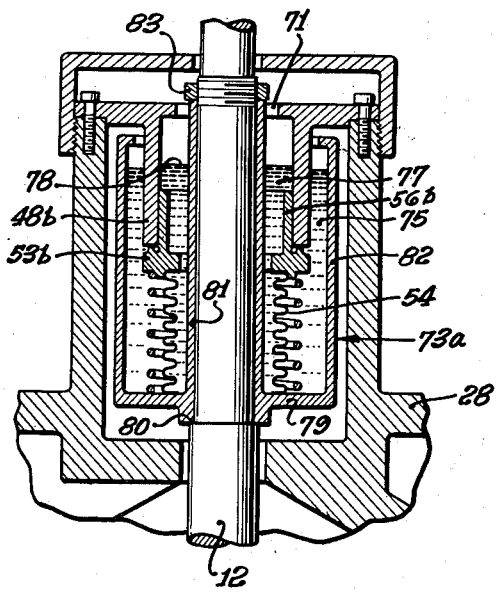

In Fig. 6, the arrangement is essentially the same as in Fig. 5. In addition, an inner liquid seal 77 is provided in the annular space between the shaft 12 and the rotary and non-rotary members 53b, 48b. The level 78 of this seal is above the upper end of the telescopic flange 56b, to prevent the well liquid 13 from coming in contact with the circumferential sealing surfaces. Thus, both the well liquid 13 and the liquid filling 36 in the casing are prevented from contacting the sealing surfaces. In Fig. 6, a total of four seals are present, including the inner and outer liquid seals, the annular end seal and the cylindrical seal.

In order to prevent leakage of the liquid seals from the container 73a, the latter may be formed of one piece, as disclosed in Fig. 6, with the bottom portion 79 engaging a shoulder 80 of the shaft 12, and interconnecting the inner and outer container walls 81, 82 which extend upwardly from the bottom or base. The inner wall 81 projects through the central aperture 71 of the non-rotary member 48b, where it is engaged by a nut 83 threaded on the shaft, which forces the container 73a against the shoulder 80 and clamps the container to the shaft. The rotary and non-rotary members 53b, 48b, and the bellows 54, in effect, form an intermediate wall separating the inner and outer sealing liquids 77, 75.

The inventor claims:

1. In a submersible structure: a casing; a substantially vertical shaft extending from said casing; a non-rotary annular member carried by the casing and having a downwardly directed end sealing surface; a rotary member carried by the shaft and having an upwardly facing annular sealing surface in contact with said end surface; a cylindrical flange on said rotary member extending upwardly within said non-rotary member and in telescopic relation to said non-rotary member; a container fixed with respect to said shaft and disposed along the exterior of said members to form an annular space therewith; a sealing liquid in said annular space disposed along said members and having a level above said annular contacting surfaces; and a sealing liquid within said members having a level above the upper end of said flange.

2. In a submersible structure: a casing; a rotary shaft extending from the casing; a non-rotary annular member carried by the casing and surrounding the shaft; a rotary container carried by the shaft and forming an annular space around said non-rotary member; a relatively axially movable member carried by the shaft and within the container, said axially movable member having an annular surface of contact with the lower edge of the non-rotary member; a flange carried by said axially movable member and in telescopic fit with the interior of said non-rotary member; and liquid seals both exteriorly and interiorly of the non-rotary annular member, said seals overlapping the areas of contact.

3. In a submersible structure: a casing; a shaft extending from the casing; a non-rotary member having an opening through which said shaft extends, there being substantial clearance between said shaft and said non-rotary member; said non-rotary member having an annular surface adjacent and extending about said opening; that portion of said opening adjacent said annular surface being cylindrical; a rotary member having an annular surface and a flange inwardly of said annular surface, said flange having an exterior cylindrical surface, said rotary member having an aperture through which said shaft extends, there being substantial clearance between said shaft and said rotary member; a flexible bellows secured at one end to said rotary member; a container having inner and outer annular flanges, the inner flange being carried by the shaft and extending with clearance through the aperture of said rotary member and the opening of said non-rotary member, the outer flange extending about said members; means securing the other end of said flexible bellows to the bottom of said container, and dividing said container into separate inner and outer spaces; a compression spring urging said rotary member toward said non-rotary member, said cylindrical and said annular surfaces of said members being respectively in engagement; and sealing liquids in the spaces provided by the container, the liquid in the inner space extending above said annular flange of said rotary member, and the liquid in the outer space extending above said annular surfaces of said members.

4. In a submersible structure: a casing; a shaft extending from the casing; a non-rotary member having an opening through which said shaft extends, there being substantial clearance between said shaft and said non-rotary member; said non-rotary member having an annular surface adjacent and extending about said opening; that portion of said opening adjacent said annular surface being cylindrical; a rotary member having an annular surface and a flange inwardly of said annular surface, said flange having an exterior cylindrical surface, said rotary member having an aperture through which said shaft extends, there being substantial clearance between said shaft and said rotary member; a flexible bellows secured at one end to said rotary member; a cup-shaped container extending about said members and carried by said shaft, there being substantial clearance between said container and said members; said bellows being secured at the other end to said container member; a compression spring urging said rotary member into engagement with said non-rotary member; said cylindrical and annular surfaces of the members being respectively in engagement; a sealing liquid in the container having a level extending above said annular surfaces of said members; and a sealing liquid in said bellows and within said members, and having a level extending above the flange of said rotary member.

References Cited in the file of this patent

UNITED STATES PATENTS

| | | |
|---|---|---|
| 2,354,874 | Myers | Aug. 1, 1944 |
| 2,379,648 | Myers | July 3, 1945 |
| 2,380,222 | Curtis et al. | July 10, 1945 |
| 2,381,615 | Myers | Aug. 7, 1945 |

FOREIGN PATENTS

| | | |
|---|---|---|
| 484,628 | Germany | Oct. 17, 1929 |
| 518,339 | Great Britain | Feb. 23, 1940 |